(12) United States Patent
Clever et al.

(10) Patent No.: US 8,096,050 B2
(45) Date of Patent: Jan. 17, 2012

(54) DOUBLE BALLIZE CAMSHAFT ASSEMBLY PROCESS

(75) Inventors: Glenn E. Clever, Washington, MI (US); James Fawcett, Clarkston, MI (US); Roy Glenn Kaywood, Jackson, MI (US)

(73) Assignee: GM Global Technology Operations LLC

( * ) Notice: Subject to any disclaimer, the term of this patent is extended or adjusted under 35 U.S.C. 154(b) by 606 days.

(21) Appl. No.: 12/248,118

(22) Filed: Oct. 9, 2008

(65) Prior Publication Data
US 2010/0088890 A1    Apr. 15, 2010

(51) Int. Cl.
*B21D 53/84* (2006.01)
(52) U.S. Cl. ...................................... 29/888.1
(58) Field of Classification Search ............. 29/888.1, 29/523; 72/370.06, 370.07, 370.08
See application file for complete search history.

(56) References Cited

U.S. PATENT DOCUMENTS 5,343,618 A * 9/1994 Arnold et al. ............. 29/888.08
2008/0276753 A1 * 11/2008 Takamura ...................... 74/567

* cited by examiner

*Primary Examiner* — David Bryant
*Assistant Examiner* — Moshe Wilensky
(74) *Attorney, Agent, or Firm* — Harness, Dickey & Pierce, P.L.C.

(57) ABSTRACT

A method may include locating a first lobe member of a camshaft on a first shaft having an annular wall defining a first bore and a first outer radial surface. The first lobe member may include a second bore receiving the first shaft. The method may further include forcing first and second deforming members through the first bore. The first deforming member may have a first outer diameter that is greater than an initial inner diameter of the first shaft and may displace the annular wall in an outward radial direction to provide a first engagement between the first outer radial surface and the second bore. The second deforming member may have a second outer diameter that is greater than the first outer diameter and may displace the annular wall in the outward radial direction to provide a second engagement between the first outer radial surface and the second bore.

18 Claims, 6 Drawing Sheets

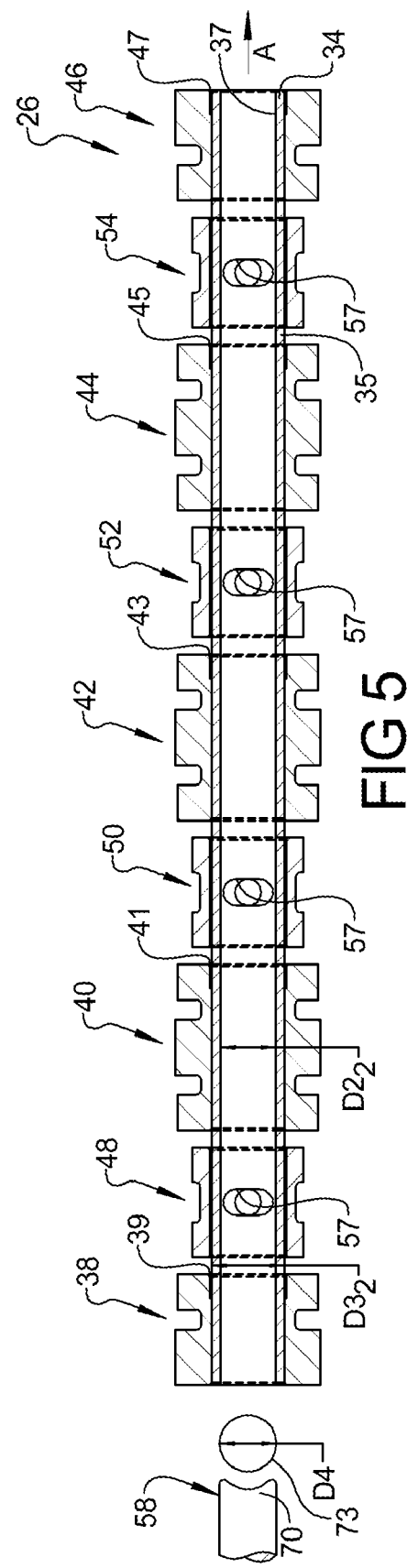

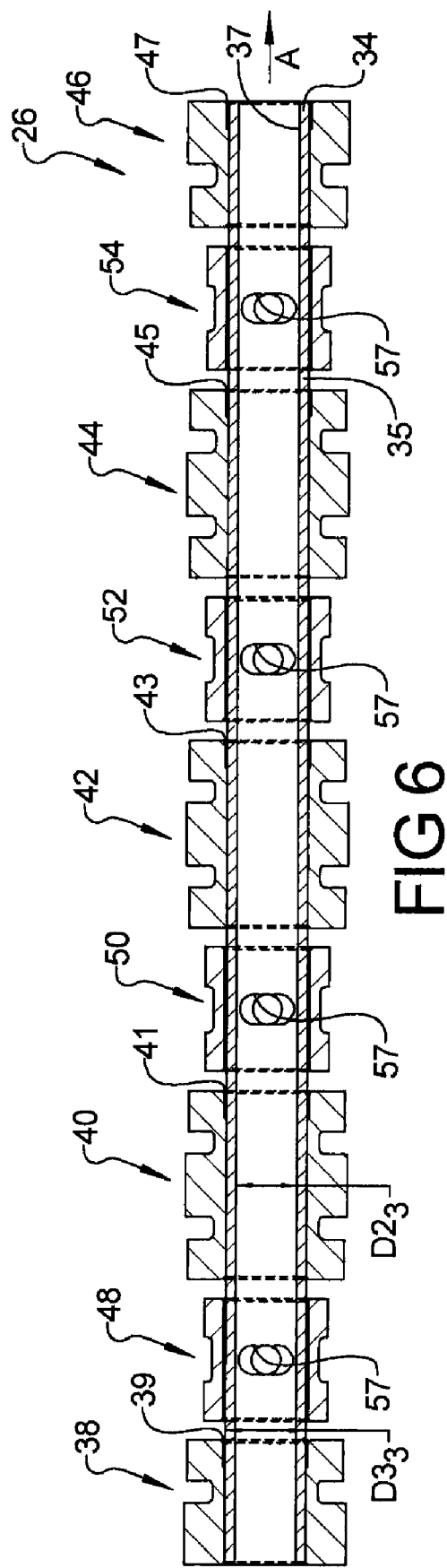

DOUBLE BALLIZE CAMSHAFT ASSEMBLY PROCESS

FIELD

The present disclosure relates to engine camshaft assemblies, and more specifically to concentric camshaft assemblies.

BACKGROUND

The statements in this section merely provide background information related to the present disclosure and may not constitute prior art.

Engines typically include a camshaft to actuate intake and exhaust valves. Some camshafts are concentric camshafts that provide for relative rotation between, for example, the intake and exhaust lobes. The intake lobes may be fixed to an outer shaft for rotation with the shaft and the exhaust lobes may be rotatably supported on the shaft. Alternatively, the exhaust lobes may be fixed to the outer shaft for rotation with the shaft and the intake lobes may be rotatably supported on the shaft. In any arrangement, the lobes that are fixed to the shaft may be fixed by forcing a tool axially through a bore of the shaft.

SUMMARY

A method may include locating a first lobe member of a camshaft on a first shaft. The first shaft may include an annular wall defining a first bore and a first outer radial surface and the first lobe member may include a second bore receiving the first shaft. The method may further include forcing first and second deforming members through the first bore. The first deforming member may have a first outer diameter that is greater than an initial inner diameter of the first shaft defined by the first bore. The first deforming member may displace the annular wall in an outward radial direction and provide a first engagement between the first outer radial surface and the second bore. The second deforming member may have a second outer diameter that is greater than the first outer diameter. The second deforming member may displace the annular wall in the outward radial direction and provide a second engagement between the first outer radial surface and the second bore.

An alternate method may include locating a first lobe member of a camshaft on a first shaft. The first shaft may include an annular wall defining a first outer radial surface and a first bore having a first inner diameter. The first lobe member may include a second bore receiving the first shaft. The method may further include forcing first and second deforming members through the bore. The first deforming member may have a first outer diameter that is greater than the first inner diameter and may provide a first torsional resistance between the first outer radial surface and the second bore. The second deforming member may have a second outer diameter providing a second torsional resistance between the first outer radial surface and the second bore. The second torsional resistance may be at least twice the first torsional resistance.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a second schematic illustration of the camshaft, tool assembly, and fixture according to the present disclosure; and FIG. 6 is a third schematic illustration of the camshaft, tool, and fixture according to the present disclosure.

DETAILED DESCRIPTION

Figure 1:
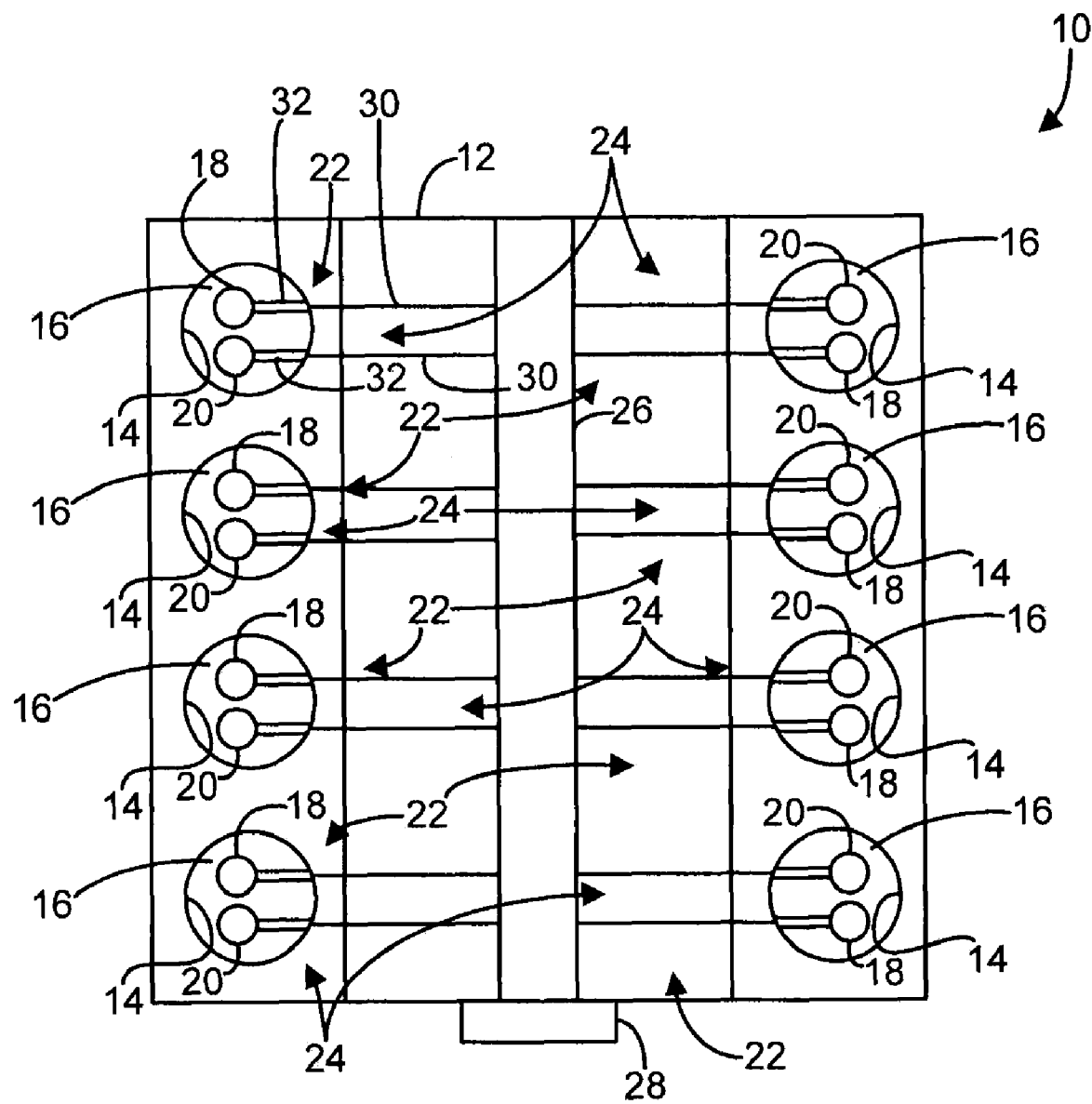
FIG. 1 is a schematic illustration of an engine assembly according to the present disclosure.
Figure 2:
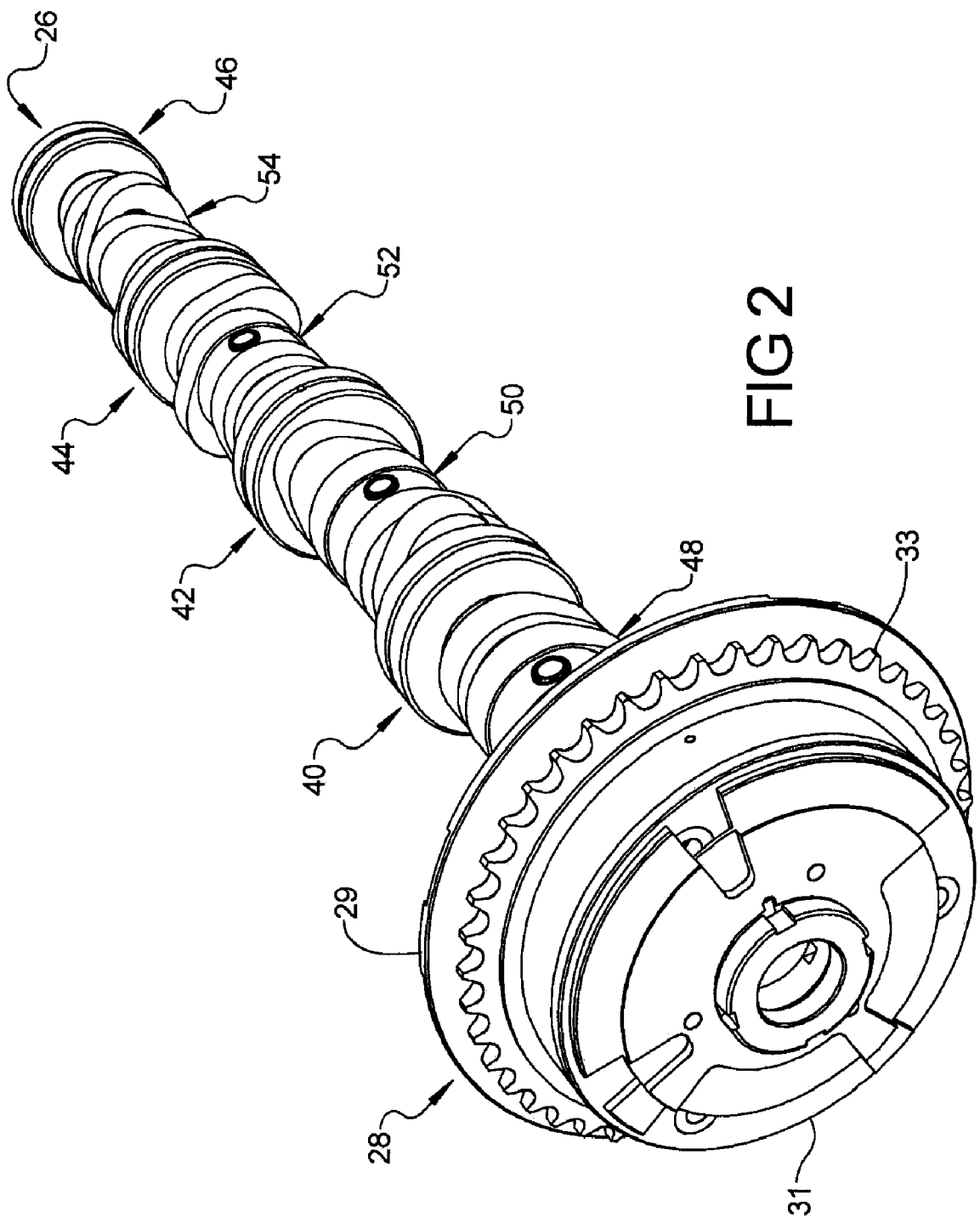
FIG. 2 is a perspective view of the camshaft and cam phaser of FIG. 1.
Figure 3:
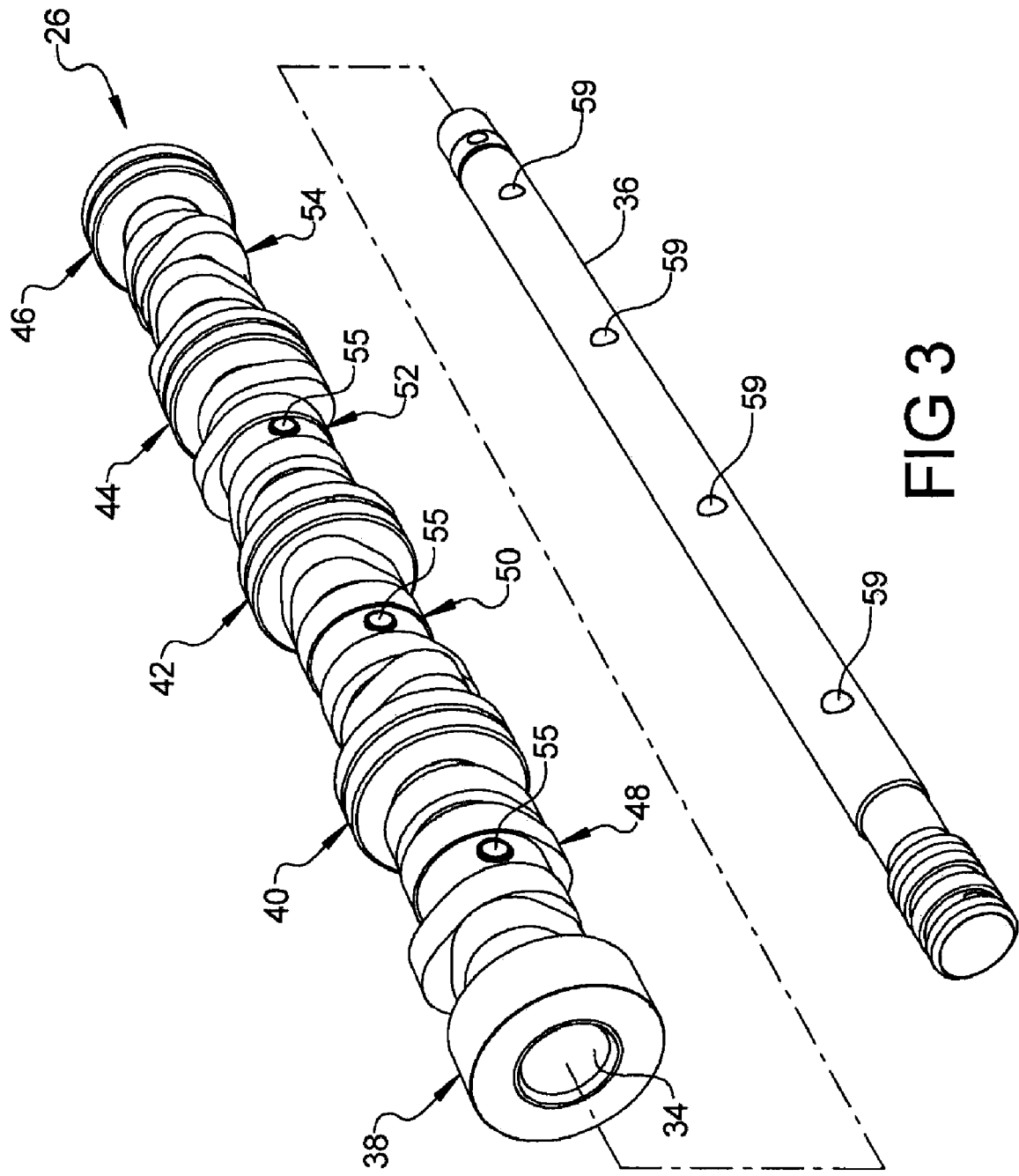
FIG. 3 is a perspective exploded view of the camshaft of FIG. 1.

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. The engine assembly 10 may include an engine 12 including a plurality of cylinders 14 having pistons 16 disposed therein. The engine 12 may further include an intake valve 18, an exhaust valve 20, and intake and exhaust valve lift mechanisms 22, 24 for each cylinder 14, as well as a camshaft 26 and a cam phaser 28.

The intake valve lift mechanism 22 may include a pushrod 30 and a rocker arm 32. The exhaust valve lift mechanism 24 may additionally include a pushrod 30 and a rocker arm 32. Pushrods 30 may be engaged with the camshaft 26 to actuate the rocker arms 32 and selectively open the intake and exhaust valves 18, 20. While the engine assembly 10 is illustrated as a pushrod engine, it is understood that the present disclosure is not limited to pushrod engines and may be applicable to a variety of other engine configurations as well, such as overhead cam engines.

With reference to FIGS. 2-6, the camshaft 26 may include first and second shafts 34, 36, a first set of lobe members 38, 40, 42, 44, 46, a second set of lobe members 48, 50, 52, 54, and drive pins 55. The first set of lobe members 38, 40, 42, 44, 46 may include annular recesses 39, 41, 43, 45, 47 in their respective bores at ends thereof. In the present example, the first set of lobe members 38, 40, 42, 44, 46 may form an intake lobe set and the second set of lobe members 48, 50, 52, 54 may form an exhaust lobe set. However, it is understood that alternate arrangements may be provided where the first set of lobe members 38, 40, 42, 44, 46 may form an exhaust lobe set and the second set of lobe members 48, 50, 52, 54 may form an intake lobe set. Further, each of the first and second sets of lobe members 38, 40, 42, 44, 46, 48, 50, 52, 54 are not limited to only intake or exhaust valves. For example, the first and second sets of lobe members 38, 40, 42, 44, 46, 48, 50, 52, 54 may each include an intake lobe and/or an exhaust lobe. The first shaft 34 may be fixed for rotation with a first phaser member 29 and the second shaft 36 may be fixed for rotation with a second phaser member 31. The first and second phaser members 29, 31 may be rotatable relative to one another and relative to a rotationally driven member 33 of the phaser 28.

The first shaft 34 may include an annular wall 35 defining an inner bore 37. The second shaft 36 may be rotatably disposed within the inner bore 37 of the first shaft 34. The first shaft 34 may include slots 57 (seen in FIGS. 4-6) therethrough and the second shaft 36 may include apertures 59 that receive the pins 55 therein and couple the second set of lobe members 48, 50, 52, 54 for rotation with the second shaft 36.

The slots 57 in the first shaft 34 may generally allow for a rotational travel of the pins 55 therein.

The first set of lobe members 38, 40, 42, 44, 46 may be fixed for rotation with the first shaft 34. The engagement between the first set of lobe members 38, 40, 42, 44, 46 and the first shaft 34 may include a friction fit engagement. The second set of lobe members 48, 50, 52, 54 may be disposed between adjacent ones of the first set of lobe members 38, 40, 42, 44, 46. A tool assembly 58 (seen in FIGS. 4-6) may deform the first shaft 34 in an outward radial direction to fix the first set of lobe members 38, 40, 42, 44, 46 to the first shaft 34.

Figure 4:
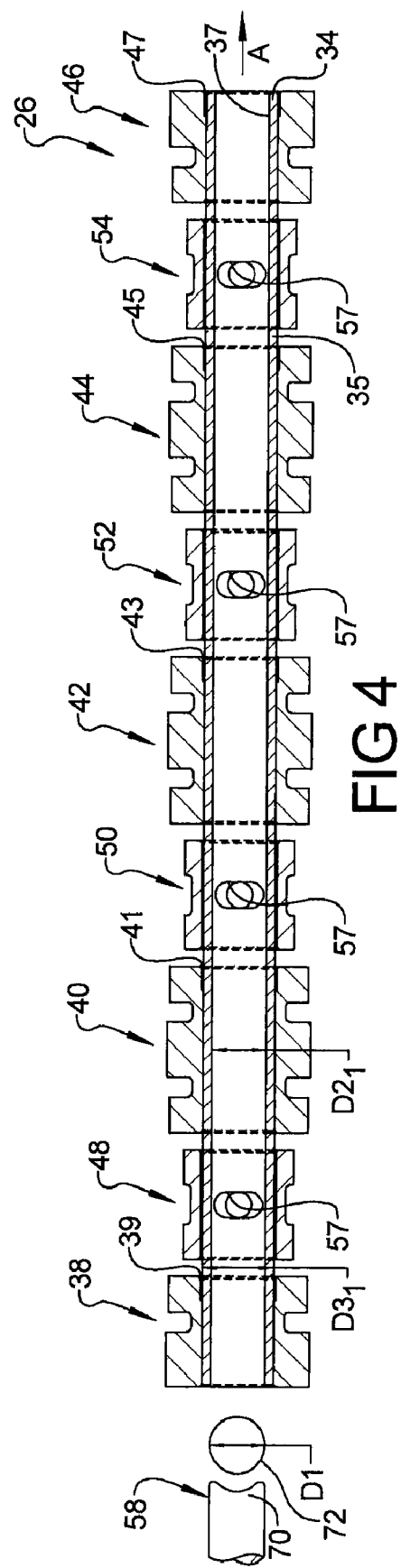
FIG. 4 is a first schematic illustration of a camshaft, a tool assembly, and a fixture according to the present disclosure.

The tool assembly 58 may include a shaft 70 and first and second deforming members 72, 73. The first deforming member 72 (seen in FIG. 4) may have an outward radial extent that is greater than an initial outward radial extent of the bore 37 of the first shaft 34. In the present example, the first deforming member 72 may be generally spherical, having an outer diameter (D1) that is greater than an initial inner diameter ($D2_1$) of the first shaft 34. During assembly of the camshaft 26, the first shaft 34 may be fixed axially and the first set of lobe members 38, 40, 42, 44, 46 and the second set of lobe members 48, 50, 52, 54 may be located on the first shaft 34 (as seen in FIG. 4). The first deforming member 72 may then be forced in an axial direction (A) through the inner bore 37 of the first shaft 34.

The greater diameter (D1) of the first deforming member 72 may force the annular wall 35 in an outward radial direction and into engagement with the first set of lobe members 38, 40, 42, 44, 46 (seen in FIG. 5). More specifically, the first deforming member 72 may deform the first shaft 34 to create an intermediate inner diameter ($D2_2$) and may expand the initial outer diameter ($D3_1$) of the first shaft 34 to an intermediate outer diameter ($D3_2$) to create the engagement between the first set of lobe members 38, 40, 42, 44, 46 and the first shaft 34.

The relation between the diameter (D1) of the first deforming member 72 and the initial inner diameter ($D2_1$) of the first shaft 34 may provide for a majority of the material displaced by the first deforming member 72 to be displaced radially outward. Additional material of the first shaft 34 may be forced axially along the first shaft 34 and radially into recesses 39, 41, 43, 45, 47 as the first deforming member 72 passes through the first shaft 34. The frictional engagement between the first set of lobe members 38, 40, 42, 44, 46 and the first shaft 34 provided by the first deforming member 72 may axially retain the first set of lobe members 38, 40, 42, 44, 46 on the first shaft 34 for the subsequent engagement with the second deforming member 73. By way of non-limiting example, the first deforming member 72 may provide a frictional engagement between the first set of lobe members 38, 40, 42, 44, 46 and the first shaft 34 having a first torsional resistance of between thirty-five and seventy-five Newton-meters (N-m).

The second deforming member 73 (seen in FIG. 5) may have an outward radial extent that is greater than an intermediate outward radial extent of the bore 37 of the first shaft 34. In the present example, the second deforming member 73 may be generally spherical, having an outer diameter (D4) that is greater than the intermediate inner diameter ($D2_2$) of the first shaft 34. During assembly of the camshaft 26, the second deforming member 73 may be forced through the first shaft 34 after the first deforming member 72. The second deforming member 73 may be forced in the axial direction (A) through the inner bore 37 of the first shaft 34.

The greater diameter (D4) of the second deforming member 73 may force the annular wall 35 in an outward radial direction and into further engagement with the first set of lobe members 38, 40, 42, 44, 46 (seen in FIG. 6). More specifically, the second deforming member 73 may deform the first shaft 34 to create a final inner diameter ($D2_3$) and may expand the intermediate outer diameter ($D3_2$) of the first shaft 34 to a final outer diameter ($D3_3$) to create the engagement between the first set of lobe members 38, 40, 42, 44, 46 and the first shaft 34.

The relation between the diameter (D4) of the second deforming member 73 and the intermediate inner diameter ($D2_2$) of the first shaft 34 may provide for a majority of the material displaced by the second deforming member 73 to be displaced radially outward. Additional material of the first shaft 34 may be forced axially along the first shaft 34 and radially into recesses 39, 41, 43, 45, 47 as the second deforming member 73 passes through the first shaft 34. The amount of material of the first shaft 34 forced axially by the first and second deforming members 72, 73 may be less than the amount that would result from using a single deforming member having the diameter (D4) of the second deforming member 73, reducing an amount of distortion introduced to bearing surfaces of the first shaft 34 supporting the second set of lobe members 48, 50, 52, 54. As a result, the bearing surfaces of the first shaft 34 may be free from machining operations after the second deforming member 73 has been forced through the bore 37.

The frictional engagement between the first set of lobe members 38, 40, 42, 44, 46 and the first shaft 34 provided by the second deforming member 73 may rotationally fix the first set of lobe members 38, 40, 42, 44, 46 on the first shaft 34 for engagement with an engine valve train. For example, the frictional engagement provided by the second deforming member 73 may be greater than a torsional load applied to the first set of lobe members 38, 40, 42, 44, 46 by an engine valve train component, such as the rocker arm 32. By way of non-limiting example, the second deforming member 73 may provide a frictional engagement between the first set of lobe members 38, 40, 42, 44, 46 and the first shaft 34 having a second torsional resistance greater than the first torsional resistance. The second torsional resistance may be at least twice the first torsional resistance. The second torsional resistance may be greater than one hundred N-m, and more specifically greater than one hundred and fifty N-m.

What is claimed is:

1. A method comprising:
locating a first lobe member of a camshaft on a first shaft, the first shaft including an annular wall defining a first bore and a first outer radial surface, the first lobe member including a second bore, the locating including the first shaft being located within the second bore;
locating a second lobe member of the camshaft on the first shaft;
forcing a first deforming member having a first outer diameter through the first bore, the first outer diameter being greater than an initial inner diameter of the first shaft defined by the first bore and the forcing displacing the annular wall in an outward radial direction and providing a first engagement between the first outer radial surface and the second bore; and
forcing a second deforming member having a second outer diameter through the first bore, the second outer diameter being greater than the first outer diameter and the forcing the second deforming member displacing the annular wall in the outward radial direction and providing a second engagement between the first outer radial surface and the second bore, the second lobe member being supported on the first shaft for rotation relative to the first shaft after the forcing the second deforming member.

2. The method of claim 1, wherein the first engagement includes a first torsional resistance between the first lobe member and the first shaft and the second engagement includes a second torsional resistance between the first lobe member and the first shaft at least twice the first torsional resistance.

3. The method of claim 1, wherein the first engagement includes a first torsional resistance between the first lobe member and the first shaft of between 35 and 75 Newton-meters (N-m).

4. The method of claim 3, wherein the second engagement includes a second torsional resistance between the first lobe member and the first shaft of at least 100 N-m.

5. The method of claim 4, wherein the second torsional resistance is at least twice the first torsional resistance.

6. The method of claim 1, wherein the first engagement axially retains the first lobe member.

7. The method of claim 6, wherein the second engagement rotationally fixes the first lobe member on the first shaft and provides a frictional engagement having a torsional resistance greater than a torsional load applied to the first lobe member by a valve train component engaged with the first lobe member.

8. The method of claim 1, wherein an outer radial surface of the first shaft forms a bearing surface for the second lobe member.

9. The method of claim 8, wherein the bearing surface is free from machining after the forcing the second deforming member.

10. The method of claim 1, wherein the first lobe member includes an annular recess in an end of the second bore, the forcing the first and second deforming members forcing a material forming the first shaft axially along the first shaft and in an outward radial direction into the recess.

11. A method comprising:
  locating a first lobe member of a camshaft on a first shaft, the first shaft including an annular wall defining a first outer radial surface and a first bore having a first inner diameter, the first lobe member including a second bore receiving the first shaft;
  locating a second lobe member of the camshaft on the first shaft;
  forcing a first deforming member having a first outer diameter greater than the first inner diameter through the first bore to provide a first torsional resistance between the first outer radial surface and the second bore; and
  forcing a second deforming member having a second outer diameter through the first bore to provide a second torsional resistance between the first outer radial surface and the second bore, the second torsional resistance being at least twice the first torsional resistance, the second lobe member being supported on the first shaft for rotation relative to the first shaft after the forcing the second deforming member.

12. The method of claim 11, wherein the first torsional resistance is between 35 and 75 Newton-meters (N-m).

13. The method of claim 12, wherein the forcing the first deforming member axially locates the first lobe member on the first shaft.

14. The method of claim 11, wherein the second torsional resistance is at least 100 Newton-meters (N-m).

15. The method of claim 14, wherein the forcing the second deforming member rotationally fixes first lobe member on the first shaft, the second torsional resistance being greater than a torsional load applied to the first lobe member by a valve train component engaged with the first lobe member.

16. The method of claim 11, wherein the first outer radial surface of the first shaft forms a bearing surface for the second lobe member.

17. The method of claim 16, wherein the bearing surface is free from machining after the forcing the second deforming member.

18. The method of claim 11, wherein the first lobe member includes an annular recess in an end of the second bore, the forcing the first and second deforming members forcing a material forming the first shaft axially along the first shaft and in an outward radial direction into the recess.

\* \* \* \* \*